United States Patent
King et al.

[15] 3,684,768
[45] Aug. 15, 1972

[54] THERMALLY STABLE POLYESTERS HAVING IMPROVED DYEABILITY

[72] Inventors: Henry L. King, 919 Washington St.; Eugene L. Ringwald, 1021 Warren Ave., both of Cary, N.C. 27511; James C. Randall, 1307 Hampden Square, Bartlesville, Okla. 74003

[22] Filed: July 17, 1970

[21] Appl. No.: 55,872

[52] U.S. Cl. ..............................260/75 R, 8/DIG. 4
[51] Int. Cl. ..............................................C08g 17/08
[58] Field of Search ...............................260/75; 9/7

[56] References Cited

UNITED STATES PATENTS 2,895,946  7/1959  Huffman......................260/75
3,505,294  4/1970  Ishii et al. ....................260/75

FOREIGN PATENTS OR APPLICATIONS 1,559,628  3/1969  France

*Primary Examiner*—Melvin Goldstein
*Attorney*—Thomas Y. Awalt, Jr., Robert L. Broad, Jr., Neal E. Willis and E. J. Fischer

[57] ABSTRACT

Thermally stable polyesters having improved dyeability with disperse dyes are produced from dicarboxylic acids or reactive derivatives thereof, polymethylene glycols and small amounts of a dihydroxypropoxypoly(alkyleneoxy) alkane of the formula

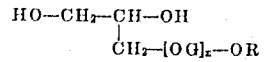

where R is an alkyl group containing an average of from about eight to 20 carbon atoms; G is a hydrocarbon radical selected from the group consisting of ethylene, propylene and isomers thereof, and mixtures of the above, and $x$ has an average value of eight to 20 and is about equal to or greater than R.

6 Claims, 3 Drawing Figures

PATENTED AUG 15 1972　　　　　　　　　　　　　　3,684,768

INVENTORS
HENRY L. KING
EUGENE L. RINGWALD
JAMES C. RANDALL

BY Thomas M. Carroll Jr.

ATTORNEY

THERMALLY STABLE POLYESTERS HAVING IMPROVED DYEABILITY

BACKGROUND OF THE INVENTION

1. Field of the Invention

This invention relates to polyesters produced by condensation reactions of polymethylene glycols and dicarboxylic acids or reactive derivatives thereof.

2. Description of the Prior Art

It is well known that the polymeric polyesters prepared by the condensation of a polymethylene glycol of its functional derivatives and a dicarboxylic acid or a polyester-forming derivative thereof, such as an acid halide, a salt, or a simple ester of a dibasic acid and a volatile mono-hydric alcohol are excellent fiber-forming polymers. Commerically, the most important of the highly polymeric polyesters is that prepared by the condensation of terephthalic acid or dimethyl terephthalate and a polymethylene glycol containing from about two to 10 carbon atoms, and particularly ethylene glycol. These polyesters are relatively insoluble, chemically inactive, hydrophobic materials capable of being formed into filaments which can be cold-drawn to produce textile fibers of superior strength and pliability. However, since these materials are not readily permeable to water, they cannot be satisfactorily dyed by ordinary dyeing procedures.

The compact structure of polyethylene terephthalate fibers, for example, the molecules of which are closely packed along the axis of the fibers, makes it quite difficult, except with a limited number of dyes, to obtain a high degree of dye bath exhaustion or to secure satisfactory deep shades. Absorption and penetration of the dye into the fiber core are limited by the inherent properties of the fiber.

A number of methods have been proposed to increase the dyeability of polyesters and particularly, polyethylene terephthalate; however, these methods have not provided to be entirely satisfactory. These methods have included the use of a number of additives to the polyester and various combinations of drawings and heat-treatment steps and procedures. Unfortunately, the use of these known procedures has resulted in thermally unstable polyesters, deterioration in fiber properties, nonuniformly dyed polymers, and the like. Finally, the art has desired some other means to produce thermally stable polyesters having improved dyeability. Thermally stable polyesters with improved dyeability would clearly have significant commercial and practical value and utility.

SUMMARY OF THE INVENTION

The present invention provides thermally stable polyester compositions having improved dyeability comprising a fiber-forming polyester prepared from a dicarboxylic acid and a polymethylene glycol and containing in the polymer molecule a small amount of dihydroxypropoxypoly(alkyleneoxy) alkane having the formula

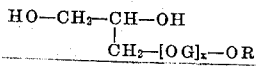

where R is an alkyl group containing an average of from about eight to 20 carbon atoms; G is a hydrocarbon radical selected from the group consisting of ethylene, propylene and isomers thereof, and mixtures of the above, and $x$ has an average value of eight to 20 and is about equal to or greater than R. The alkane additive may be used at concentrations of between 0.25 and 10.0 mole percent, based on the weight of the dicarboxylic acid or ester-forming derivative thereof or on each polyester repeating unit. Preferably, the additive is present in an amount of from about 0.5 to 3.0 mole percent, based on the weight of the dicarboxylic acid or ester-forming derivative thereof or on each polyester repeating unit. The use of less than 0.25 mole percent of the additive does not give any significant improvement in dyeability in the final product, and when more than 10.0 mole percent of the additive is employed, the product is too amorphous to have commercial utility.

The modified polyester compositions of this invention are prepared by reacting an aromatic dicarboxylic acid, the polymethylene glycol and a small amount of the alkane additive under polyesterification conditions until a fiber-forming polymeric polyester composition is obtained. Small amounts of a chain-branching agent may also be added to the reaction as desired but are not required.

The modified polyester compositions of the present invention are useful in the production of shaped articles by extrusion, molding or casting in the nature of yarns, fabrics, films, pellicles, bearings, ornaments, or the like. They are particularly useful in the production of thermally stable textile fibers having improved dyeability, particularly with disperse dyes.

To further understand the invention, reference will be made to the attached drawing that forms a part of the present application.

DESCRIPTION OF THE PREFERRED EMBODIMENTS

Figure 1:
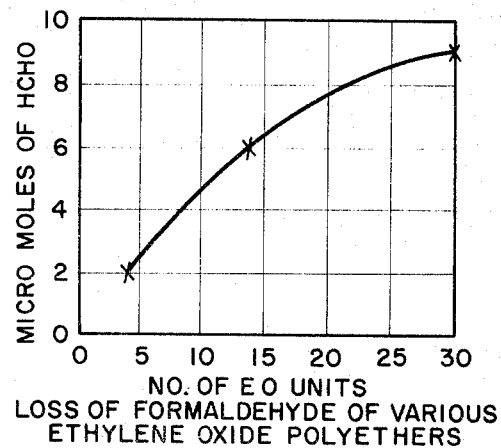
FIG. 1 is a graph showing the amount of formaldehyde loss at 195° C. for 60 minutes of ethylene oxide polyethers varying in the number of ethylene oxide units present in the molecules.

The synthetic linear condensation polyesters contemplated in the practice of the invention are those formed from dicarboxylic acids and polymethylene glycols, and copolyesters or modification of these polyesters and copolyesters. In a highly polymerized condition, these polyesters and copolyesters can be formed into filaments and the like and subsequently oriented permanently by cold drawing. The polyesters and copolyesters specifically useful in the instant invention are those resulting from heating one or more of the glycols of the series $HO(CH_2)_nOH$, in which $n$ is an integer of from 2 to 10, with one or more dicarboxylic acids or ester-forming derivatives thereof. Among the dicarboxylic acids and ester-forming derivatives thereof useful in the present invention there may be named terephthalic acid, isophthalic acid, sebacic acid, adipic acid, p-carboxyphenylacetic acid, succinic acid, p,p'-dicarboxybiphenyl, p,p'-dicarboxycarbanilide, p,p'-dicarboxythiocarbanilide, p,p'-dicarboxydiphenylsulfone, p-carboxyphenoxyacetic acid, p-carboxyphenoxypropionic acid, p-carboxyphenoxyhexanoic acid, p-carboxyphenoxyheptanoic acid, p,p'-dicarboxydiphenylmethane, p,p'-dicarboxydiphenylethane, p,o'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p'-dicarboxydiphenyoxypropane, p,p'-dicarboxydiphenoxybutane, p,p'-dicarboxydiphenoxypentane, p,p'-dicarboxydiphenoxyhexane, 3-alkyl-4beta-carboxyethoxy) benzoic acid, oxalic acid, glutaric acid, pimelic acid suberic acid, azelaic acid and the dioxy acids of ethylene dioxide having the general formula $$HOOC - (CH_2)_n - O - CH_2CH_2 - O - (CH_2)_n - COOH$$

wherein $n$ is an integer from 1 to 4, and the aliphatic, cycloaliphatic and aryl esters, ammonium and amine salts, and the acid halides of the above-named compounds, and the like. Examples of the polyhydric alcohols which may be employed in practicing the instant invention are ethylene glycol, trimethylene glycol, tetramethylene glycol and decamethylene glycol and the like. Polyethylene terephthalate, however, is the preferred polymer because of the ready availability of terephthalic acid or dimethyl terephthalate and ethylene glycol, from which it is made. It also has a relatively high melting point of about 250° through 265° C., and this property is particularly desirable in the manufacture of filaments in the textile industry.

The dihydroxypropoxypoly(alkyleneoxy) alkanes which are an essential part of this invention have the general formula

where R is an alkyl group containing an average of from about eight to 20 carbon atoms; G is a hydrocarbon radical selected from the group consisting of ethylene, propylene and isomers thereof, and mixtures of the above, and $x$ has an average value of eight to 20 and is about equal to or greater than R. Preferably $x$ is from 12 to 16 and R contains from 12–16 carbon atoms. This additive may be used at concentrations of from about 0.25 to 10.0 mole percent based on the weight of the dicarboxylic acid or ester-forming derivative thereof or on each polyester repeating unit. Preferably, the additive is present in amounts of from about 0.5 to 3.0 mole percent, based on the weight of the dicarboxylic acid or ester-forming derivative thereof or on each polyester repeating unit.

Autoxidation is the phenomenon which is responsible for much of our environmental chemistry. It is involved in the aging of fats and oils, drying of paints, and degradation of natural and synthetic fibers. The processes involved may be catalyzed by heat or light and are free radical by nature. Generally speaking, autoxidation proceeds by free radical, chain mechanisms; peroxy radicals and products from autoxidation processes are alcohols and carbonyl-containing compounds. Chain-terminating reactions significantly affect the rates of autoxidation processes.

The products observed from the autoxidation of alkoxy polyethylene glycols are principally alcohol and formate ester chain terminal groups and formaldehyde, carbon dioxide, and water. Formaldehyde is a major volatile product. As above stated, significant and surprising differences in thermal stability in the presence of oxygen have been observed among the various alkoxy polyethylene glycols. The type of alkoxy unit and the degree of polymerization are apparently related to the susceptibility of autoxidation.

It has been found, for example, that as the number of carbon atoms in the alkoxy end group is increased beyond the methoxy (with degree of polymerization held constant) there is a surprising decrease in the amount of formaldehyde evolved when the glycol additive is heated in a sweep of air at 193° C., until the alkoxy group reaches eight carbon atoms, after which there is a leveling off. Further increase beyond eight to 14 carbon atoms in the alkoxy group causes no appreciable difference in the heat stability of the glycol. Exemplifying the above, hydrocarbon terminated polyethylene glycol polymers having the structural formula

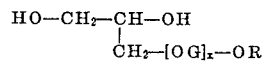

were subjected to the above described conditions, and liberated formaldehyde in accordance with the following table.

TABLE I

| R-Number of carbon atoms in hydrocarbon unit | $\mu$ mol HCHO | | | | |
|---|---|---|---|---|---|
| | 15 min. | 30 min. | 60 min. | 90 min. | 120 min. |
| 1 | 460 | 800 | 1340 | 1520 | 1700 |
| 4 | 460 | 790 | 1050 | 1140 | 1300 |
| 8 | 320 | 470 | 600 | 720 | 820 |
| 14.5 | 320 | 510 | 770 | 820 | 880 |
| 20 | 320 | 450 | 760 | 720 | 790 |

*Polyether prepared from mixture of 14 and 15 carbon alcohols.

It was also discovered that when these same polyethylene glycols were converted to dihydroxypropoxypoly(ethoxy) alkanes and used as comonomers in the production of modified polyesters, the heat stability effect is carried over to the polyester fiber.

On the other hand, where the number of carbon atoms in the alkoxy end group is held constant, the degree of polymerization of the polyether chain was increased, the compounds being heated in a sweep of air at 195° C. for 60 minutes, there is a marked increase in the number of micromoles of formaldehyde released as the degree of polymerization (number of ethylene oxide units) was increased from about five to 80, indicating a decrease in heat stability of the glycol as shown by FIG. 1. Therefore, so far as heat stability alone is concerned, and ignoring any possible effect of the relationship of the degree of polymerization to the length of the alkoxy end groups, it appears that an alkane as described above where R is an alkyl group containing no less than eight nor more than about 20 carbon atoms, and with an extremely low degree of polymerization would be optimum.

Figure 2:
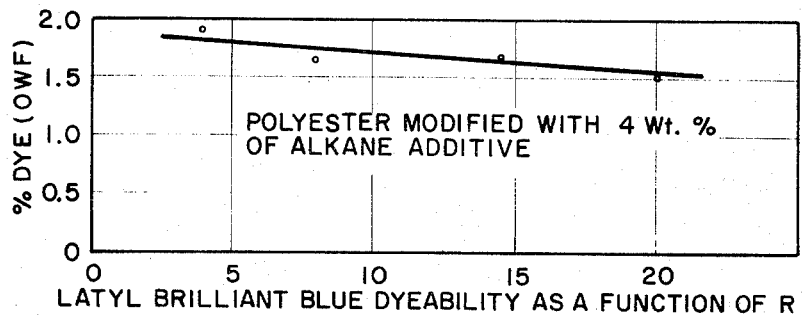
FIG. 2 is a graph showing the relative disperse dyeability in terms of percentage of the dye based on the weight of the fiber, of polyester fibers modified with dihydroxypropoxypoly(ethoxy) alkanes in which carbon atoms in the alkoxy group represented by R in the general formula were varied between 4 and 20, with the number of ethylene oxide units $(x)$ constant at a value of 12–14.
Figure 3:
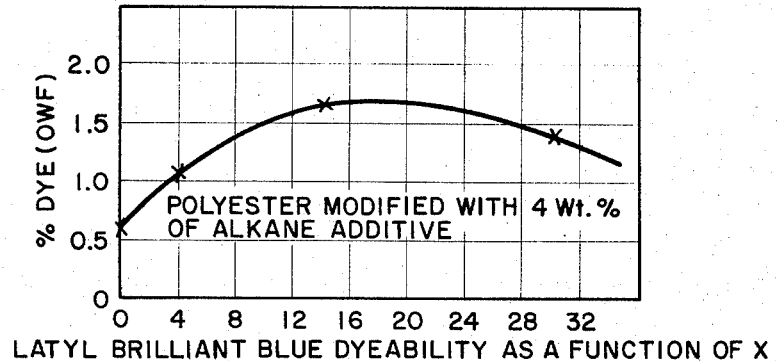

As stated above, however, dyeability of the modified polymer is an extremely important factor so far as the use of these additives is concerned. In FIG. 2, the effect on fiber dyeability of changes in the number of carbon atoms in the alkoxy group (R) with the degree of polymerization ($x$) being held constant at 11–13 is shown; and in FIG. 3, the effect of changes in the degree of polymerization ($x$) with R being held constant at 14.5 is shown. FIGS. 2 and 3 show the disperse dyeability of these compounds in terms of percent dye on the weight of the fiber, dyeing being accomplished as explained in Example 1. It will be observed from FIG. 2 that there is a tendency toward decreased dyeability as the number of carbon atoms in the alkoxy end group of the additive increased. FIG. 3 shows a substantial increase in dyeability as the degree of polymerization ($x$) is increased from about 4 to about 12–14, and thereafter a decrease in dyeability.

A minimum optimum value of 8 representing the number of carbon atoms in the alkoxy end groups has thus been established on the basis of heat stability, and a maximal optimum value of 20 has been established beyond which there is no increase in heat stability, but there is a corresponding decrease in disperse dyeability (FIG. 2).

The degree of polymerization has been established on the basis of dyeability with about 8 as a minimally marginal value and 20 as a marginally maximum value (FIG. 3), with decreasing heat stability across the range (FIG. 2). An additional limiting factor involving the relationship of R to $x$ will be developed in the examples.

The precise structure of G is not considered critical in the instant invention except insofar as it must exclude the methylene radical which causes depolymerization under polyester polymerization conditions. We have found that the ethylene and propylene radicals produce good results in accordance with this invention.

The above can be partially explained in terms of inhibition of further autoxidation by products formed from the terminal alkoxy groups in the initial stage of oxidation. Those derived from short alkyl chains are volatile at the test temperature, and escape without acting as inhibitors.

When the additive contains an alkoxy group which is an effective inhibitor of autoxidation, the number of alkyleneoxy units in the polyether additive becomes significant. It has been found that chains having more than about 25 units are not adequately stable. This is believed to result from the low concentration of the inhibiting terminal alkoxy group in such a chain. On the Other hand, a low number of alkyleneoxy units per molecule results in an excessive number of chain terminations when an adequate weight of the modifier is added to achieve the desired dyeability. Poor processability results from excessive chain termination.

Since the hydrophobic alkyl portion of the additive makes very little, if any, contribution to the enhanced dyeability, it is desirable that a major portion of the molecule be comprised of the hydrophilic polyether chain. Thus, the alkanes in which the number of oxyalkylene groups is about equal to or greater than the number of carbon atoms in the alkyl group, resulting in a polymer composed of more than seventy percent by weight of the hydrophilic polyether portion, as will be shown in the examples, are most effective. Included within the meaning of "about equal," as used herein, is ±2. The dehydropropoxypoly (alkyleneoxy) compounds may be prepared from hydroxypoly(ethoxy) alkanes, which are commercially available nonionic detergents, by reaction with epichlorohydrin to form the corresponding chlorohydrin, cyclization of the chlorohydrin to the epoxide, and hydrolysis of the epoxide to a 1,2-diol.

In a typical preparation, 234 grams of hydroxypoly(ethoxy) alkane, made by reacting tetradecanol with about 15 mole equivalents of ethylene oxide, were reacted with 31 grams of epichlorohydrin in the presence of 0.35 gram of stannic chloride pentahydrate catalyst at a temperature of 105°–119° C. for two hours. The reaction product was allowed to cool and a solution of 13.5 grams of sodium hydroxide in 14 ml. of deionized water was added, the mixture immediately becoming cloudy indicating the formation of some sodium chloride. The mixture was heated to about 100° C. and this temperature was maintained for about 2 hours. The product was cooled, filtered, and then filtered again after evaporation of water under vacuum. The clear filtrate of epoxide was mixed with an equal volume of deionized water containing 5 ml. of 60 percent perchloric acid and refluxed for 2 hours. The product was cooled and then shaken with an excess of an ion exchange resin to remove ionic material. Water was then removed from the deionized product by vacuum distillation. Measurement of the hydroxyl member by reaction of the product with phthalic anhydride gave an equivalent weight of 369 (theorical for diols, 388) and reaction with metaperiodate indicated that over 90 percent of the isolated product was the desired 1,2-dihydroxypropoxy derivative.

If desired, the modified polyesters of this invention may contain chain-branching agents or cross-linking agents, which are employed to increase the viscosity or molecular weight of the polyesters, such as polyols which have a functionality greater than two; that is, they contain more than two functional groups, such as hydroxyl. Examples of suitable compounds are pentaerythritol; compounds having the formula $$R-(OH)_n$$

wherein R is an alkylene group containing from three to six carbon atoms and $n$ is an integer from 3 to 6, for example, glycerols, sorbitol, hexane triol- 1,2,6 and the like; compounds having the formula $$R-(CH_2OH)_3$$

wherein R is an alkyl group containing from two to six carbon atoms, for example, trimethylol ethane, trimethylol propane, and the like compounds up to a trimethylol hexane; and the compounds having the formula

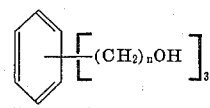

wherein n is an integer from 1 to 6. As examples of compounds having the above formula there may be named trimethylol benzene-1,3,5; triethylol benzene-1,3,5; tripropylol benzene-1,3,5; tributylol benzene-1,3,5; and the like.

Aromatic polyfunctional acid esters may also be employed in this invention as chain-branching agents and particularly those having the formula

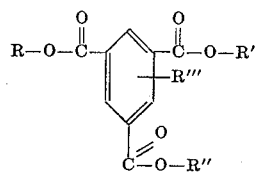

and in which R,R' and R'' are alkyl groups containing one to three carbon atoms and R''' is hydrogen or alkyl groups having one to two carbon atoms. As examples of compounds having the above formula there may be named trimethyl trimesate, tetramethyl pyromellitate, tetramethyl mellophanate, trimethyl hemimellitate, trimethyl trimellitate, tetramethyl prehnitate, and the like. In addition, there may be employed mixtures of the above esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mole percent to 2.4 mole percent, based on the amount of dicarboxylic acid or ester-forming derivative thereof employed in the reaction mixture. The preferred range of chain-branching agent for use in the present invention is from 0.1 to 1.0 mole percent.

In the practice of the present invention, the dibasic acid or ester-forming derivative thereof, the glycol and the dihydroxypropoxy(alkylenoxy) alkane are charged to the reaction vessel at the beginning of the first stage of the esterification reaction, and the reaction proceeds as in any well known esterification polymerization. If desired, the chain-branching or cross-linking agent may also be charged to the reaction vessel at this time.

When preparing the polyester from an ester, such as dimethyl terephthalate, the first stage of reaction is carried out at about 170°–180° C. and at a pressure of 0 to 7 p.s.i.g. If the polyester is prepared from the acid, such as terephthalic acid, the first stage of reaction is carried out at about 220°–260° C. and at a pressure of 15 to 60 p.s.i.g. The methanol or water evolved during the first stage of reaction is continuously removed by distillation. At the completion of the first stage, the excess glycol, if any, is distilled off prior to entering the second stage of the reaction.

In the second or polymerization stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003 percent oxygen.

For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300° C. This stage of the reaction may be effected in either the liquid, melt, or solid phase. In the liquid phase particularly, reduced pressures must be employed in order to remove the free ethylene glycol which emerges from the polymer as a result of the condensation reaction.

Although the process of this invention may be conducted stepwise, it is particularly adaptable for use in the continuous production of polyesters. In the preparation of the described polyesters, the first stage of the reaction takes place in approximately ¾ to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, have specific viscosities in the order of about 0.25 to 0.6, which represent the fiber- and filament-forming polymers. It is to be understood, of course, that non-fiber-forming polyesters may be produced by means of the present invention, which have a greater or less melt viscosity than that reiterated above. For example, polyesters which are useful in the coating compositions, lacquers, and the like are within the scope of the present invention.

Specific viscosity, as employed herein, is represented by the formula $$\eta_{sp} = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at about 25° C. through a capillary viscosity tube. In all determinations of the polymer solution viscosities, a polymer containing 0.5 percent by weight of the polymer dissolved in a solvent mixture containing two parts by weight of phenol and one part by weight of 2,4,6-trichlorophenol, based on the total weight of the mixture, is employed.

The polyesters of this invention may be produced to form filaments and films by melt-spinning methods and can be extruded or drawn in the molten state to yield products that can be subsequently cold-drawn to the extent of several hundred percent of their original lengths, whereby molecularly oriented structures of high tenacity may be obtained. The condensation product can be cooled and comminuted followed by subsequent remelting and processing to form filaments, films, molded articles, and the like.

Alternatively, the polyesters of this invention may be processed to shaped objects by the wet-spinning method, wherein the polyesters are dissolved in a suitable solvent and the resulting solution is extruded through a spinnerette into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or those agents may be incorporated with the initial reactants. Such added agents might be plasticizers, antistatic agents, fire-retarding agents, stabilizers and the like.

To further illustrate the present invention and the advantages thereof, the following specific examples are given, it being understood that these are merely intended to be illustrative and not limitative. Unless otherwise indicated, all parts and percents are by weight.

The following procedure was used to prepare the polymers in the examples. The charge was added directly to a standard polyester autoclave and the system was purged six times with nitrogen, allowing the pressure to rise to 150 p.s.i.g., and then releasing it slowly to atmospheric pressure each time. The maximum rate of heating was then applied to the closed system, and when the temperature inside the autoclave had reached 100° to 125° C., the stirrer was started. When the temperature of the outside wall of the autoclave had reached about 250° C. (the inside temperature being about 230° to 235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set at 150 r.p.m. This esterification step usually took from about 40 to 60 minutes for completion, after which the pressure of the system was adjusted to atmospheric pressure. The heating rate was then increased until the temperature reached about 280° C. During this time, excess ethylene glycol was distilled off. An ethylene glycol slurry of titanium dioxide was introduced through an injection port when the inside temperature had reached about 260° to 265° C. When the inside temperature reached about 280° C., vacuum was applied. The inside temperature was maintained at about 280° C. and the pressure was maintained at about 0.1 mm. Hg., and the polymerization continued until a polymer having a specific viscosity in the fiber-forming range between 0.30 to 0.34 was formed. The polymer was extruded directly from the autoclave, and the filaments obtained were drawn about five times their original length over a hot pin at about 80° C.

The dyeing test used throughout the examples was as follows: Fiber was scoured and dried. Five hundred milligrams of fiber and 20 ml. of dye solution were placed in a small glass tube capable of withstanding internal pressure. The dye solution was prepared by mixing 250 mg. of a dispersed dye and 0.5 gram of a commercial dispersing agent in a 250 ml. volumetric flask together with an amount of deionized water sufficient to fill the flask to the mark. The dye tubes were placed in a rotating rack held within a steam bath, and rotated for 2 hours at a temperature of about 210° F. The tubes were then quickly quenched in ice, and 5 ml. aliquots were pipeted into 50 ml. volumetric flasks which were then filled with dimethylformamide. The optical density of each solution was measured in a 1 cm. cell at the dominant wavelength of the dye. A blank tube (dye only) was also prepared and its optical density measured in the same way. The percent dye uptake on weight of the fiber (o.w.f.) was calculated using the following equation:

$$\frac{\text{O.D. Blank} - \text{O. D. Sample}}{\text{O. D. Blank}} \times \text{original dye concentration \%} = \text{\% dye uptake (o.w.f.)}$$

During the processing of polyester filaments, staple, blends, fabric and the like, heating at various temperatures for various periods of time is often necessary, e.g., polyester fabrics may be subjected to temperatures of 175° C. or higher for periods of up to 10 minutes or more. The following thermal stability tests were run where indicated: A 5-gram sample of the polyester was fluffed into a ball, placed in an aluminum cup into which about 10 half-inch holes had been punched, and the ball was heated for 10 minutes at 175° C. in a circulating air oven, often with a thermocouple held at the center of the ball.

EXAMPLE 1

The autoclave was charged with 166 grams of terephthalic acid, 400 ml. of ethylene glycol, 0.067 gram of antimony trioxide, 0.078 gram of lithium sulfate, and 7.8 grams of the dihydroxypropoxyl derivative of an ethoxylated alcohol, the latter having been made by reacting tetradecanol with 14 molar equivalents of ethylene oxide. Polymer and fiber were prepared following the procedure described above.

The fiber took up 2.9 percent o.w.f. of Latyl Yellow 3G dye (C.I. Disperse Yellow 54) from a 4 percent o.w.f. bath as compared to 0.8 percent for unmodified polyethylene terephthalate, and 9.4 percent o.w.f. of Latyl Cerise B dye (C.I. Disperse Red 59) from a 12 percent o.w.f. bath as compared to 4.6 percent for unmodified polyethylene terephthalate.

EXAMPLE 2

The charge was identical to that used in Example 1 except 0.5 ml. of a glycol phosphite (the reaction product of 25 parts of trimethyl phosphite and 225 parts of ethylene glycol with the methanol formed being removed) was added. Polymer and fiber were prepared following the procedure described above.

The fiber took up 3.0 percent o.w.f. of the Latyl Yellow 3G dye and 9.5 percent o.w.f. of the Latyl Cerise B dye. The effect of the presence of a conventional color stabilizer is shown by this example.

EXAMPLE 3

The autoclave was charged with 166 grams of terephthalic acid, 400 ml. of ethylene glycol, 0.067 gram of antimony trioxide, 0.5 ml. of the glycol phosphite of Example 2, 0.1 gram of sodium sulfate and 14.1 grams of the dihydroxypropoxyl derivative of an ethoxylated alcohol, the latter having beem made by reacting stearyl alcohol with four molar equivalents of ethylene oxide. Polymer and fiber were prepared following the procedure described above.

The fiber took up 3.4 percent o.w.f. of the Latyl Yellow 3G dye and 11.0 percent o.w.f. of the Latyl Cerise B dye, but it should be noted that a much larger amount (6.8 percent) of the alkane was used.

EXAMPLE 4

The autoclave was charged with 166 grams of terephthalic acid, 400 ml. of ethylene glycol, 0.067 gram of antimony trioxide, 1.0 gram of lithium acetate, 0.1 gram of the glycol phosphite of Example 2, and 7.8 grams of the dihydroxypropoxyl derivative of an ethoxylated alcohol, the latter having been prepared from dodecyl alcohol and ten molar equivalents of ethylene oxide. Polymer and fiber were prepared following the procedure described above.

The fiber took up 3.0 percent o.w.f. of the Latyl Yellow 3G dye and 9.6 percent o.w.f. of the Latyl Cerise B dye.

EXAMPLE 5

A polyester autoclave was charged with 250 grams of polyethylene terephthalate prepolymer (prepared in a standard procedure by a continuous reaction in which a slurry of ethylene glycol and terephthalic acid in a molar ratio of 4 to 1 was reacted in a stirred reactor at 260° C. and at a pressure of 26 p.s.i.g. with aqueous glycol vapor being continuously bled from the system) and 15.5 grams of the alkane additive of Example 4. Polymerization was carried out and fibers were prepared following the procedure described above.

The fiber took up 3.3 percent o.w.f. of the Latyl Yellow 3G dye and 11.0 percent o.w.f. of the Latyl Cerise B dye.

EXAMPLE 6

Thirty pounds of terephthalic acid, 42 pounds of ethylene glycol, 8.5 grams of antimony ethylene glycoloxide, and 6 pounds of a mixture of 3 pounds of ethylene glycol, 1.5 pounds of water and 1.5 pounds of the dihydroxypropoxyl derivative of an ethoxylated alcohol, the latter having been prepared by reacting Neodol 45 with fourteen molar equivalents of ethylene oxide, were reacted continuously in an autoclave at 265° to 270° C. and at a pressure of 26 p.s.i.g. with a mean residence time of about 90 minutes, the excess glycol and water of esterification being bled out. The esterification as completed in a falling film evaporator held at 265° to 270° C. and under atmospheric pressure. The product of this zone then entered a reactor maintained at 280° C. and at a vacuum of about 1 mm. Hg., where it was continuously formed into thin films to facilitate build-up of molecular weight. The high molecular weight product obtained was spun into fiber having a spun denier of about 325. This fiber was drawn about 4.5 times its original length through a hot water bath.

The fiber took up 1.8 percent o.w.f. of Latyl Brilliant Blue 2G dye (C.I. Disperse Blue 61) and 4 percent o.w.f. bath as compared to 0.6 percent o.w.f. of the Latyl Yellow 3G dye and 10.3 percent o.w.f. of the Latyl Cerise B dye.

A 5-gram sample of the fiber was carded into a ball and heated for 10 minutes at 175° C. in a circulating air oven. The fiber did not decompose or fuse. Although readily dyeable, polyester fibers prepared from polyethylene terephthalate modified with 0.5 mole percent of methoxypolyethylene glycol having an average molecular weight of about 2,000, or the alkane of the described general formula, where $R = 1$ and $x = 20$ or greater, will fuse severely under this test.

EXAMPLES 7–13

Examples 7–13 were conducted in the same fashion as Example 1 except that the composition of the alkane additive varied as shown in the following table along with the dyeing results:

TABLE II

| Example | R | x | % Latyl Brilliant Blue 2G Uptake |
| --- | --- | --- | --- |
| 7 | 14–15 | 4 | 1.09 |
| 8 | 14–15 | 30 | 1.41 |
| 9 | 14–15 | 14 | 1.67 |
| 10 | 12 | 20 | 1.54 |
| 11 | 4 | 12 | 1.83 |
| 12 | 8 | 12 | 1.66 |
| 13 | 20 | 12 | 1.49 |
| 14 (control) | 0 | 10 | 0.6 |

As shown in Example 13, where the value of R is significantly greater than $x$, although within the eight to 20 range, dye uptake is measurably less.

We claim:

1. A fiber-forming disperse dyeable thermally stable synthetic linear condensation polyester of a dihydric alcohol having the formula: $HO(CH_2)_nOH$, in which $n$ is an integer of from 2 to 10, and terephthalic acid, modified with from about 0.25 to 10 mole percent, based on each polyester repeating unit, of a comonomer comprising mixtures of compounds having a typical general formula:

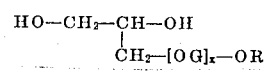

where R is an alkyl group containing an average of from about eight to 20 carbon atoms; G is a hydrocarbon radical selected from the group consisting of ethylene, propylene and mixtures of the above; and $x$ has an average value of from eight to 20, and is about equal to or greater than R.

2. A new composition of matter as defined in claim 1 wherein the synthetic linear condensation polyester is prepared from terephthalic acid and ethylene glycol and further modified with up to 0.5 mole percent, based on each polyester repeating unit, of a chain-branching agent.

3. The new composition of matter defined in claim 2 wherein the chain-branching agent is pentaerythritol.

4. A new composition of matter as defined in claim 1 wherein the additive is present in from about 0.5 to 3.0 mole percent, based on each polyester repeating unit; R is an alkyl group containing an average of 12–16 carbon atoms and G is an ethylene radical.

5. A shaped article formed from the composition of matter as defined in claim 1.

6. A dyed fiber made from the composition of matter as defined in claim 1.

* * * * *